US010221291B2

(12) United States Patent
Kohlstrung et al.

(10) Patent No.: US 10,221,291 B2
(45) Date of Patent: Mar. 5, 2019

(54) THERMALLY EXPANDABLE COMPOSITIONS

(71) Applicant: Henkel AG & Co. KGaA, Duesseldorf (DE)

(72) Inventors: Rainer Kohlstrung, Plankstadt (DE); Klaus Rappmann, Weinheim-Rittenweier (DE)

(73) Assignee: Henkel AG & CO. KGaA, Duesseldorf (DE)

( * ) Notice: Subject to any disclaimer, the term of this patent is extended or adjusted under 35 U.S.C. 154(b) by 0 days.

(21) Appl. No.: 15/265,937

(22) Filed: Sep. 15, 2016

(65) Prior Publication Data

US 2017/0002164 A1 Jan. 5, 2017

Related U.S. Application Data

(63) Continuation of application No. PCT/EP2015/055885, filed on Mar. 20, 2015.

(30) Foreign Application Priority Data

Mar. 21, 2014 (DE) .................. 10 2014 205 330

(51) Int. Cl.
| | | |
|---|---|---|
| B32B 41/00 | (2006.01) | |
| C08J 9/10 | (2006.01) | |
| B29C 44/18 | (2006.01) | |
| C08J 9/00 | (2006.01) | |
| C08J 9/08 | (2006.01) | |
| B62D 29/00 | (2006.01) | |

(52) U.S. Cl.
CPC ............... *C08J 9/105* (2013.01); *B29C 44/18* (2013.01); *B62D 29/002* (2013.01); *C08J 9/0004* (2013.01); *C08J 9/0061* (2013.01); *C08J 9/08* (2013.01); *C08J 9/103* (2013.01); *C08J 2201/026* (2013.01); *C08J 2203/02* (2013.01); *C08J 2203/04* (2013.01); *C08J 2207/00* (2013.01); *C08J 2207/02* (2013.01); *C08J 2300/22* (2013.01); *C08J 2300/24* (2013.01); *C08J 2300/26* (2013.01); *C08J 2309/00* (2013.01); *C08J 2309/06* (2013.01); *C08J 2323/08* (2013.01); *C08J 2353/02* (2013.01); *C08J 2363/00* (2013.01); *C08J 2409/06* (2013.01); *C08J 2423/08* (2013.01)

(58) Field of Classification Search
CPC . C08J 9/105; C08J 9/103; C08J 9/0004; C08J 9/0061; C08J 9/08; C08J 2423/08; C08J 2409/06; C08J 2201/026; B62D 29/002; B29C 44/18

See application file for complete search history.

(56) References Cited

U.S. PATENT DOCUMENTS

| | | |
|---|---|---|
| 5,274,006 A | 12/1993 | Kagoshima et al. |
| 7,202,284 B1 | 4/2007 | Limerkens et al. |
| 2012/0247637 A1 | 10/2012 | Tanaka et al. |
| 2014/0131910 A1 | 5/2014 | Kohlstrung et al. |
| 2015/0246646 A1 | 9/2015 | Kohlstrung et al. |

FOREIGN PATENT DOCUMENTS

| | | |
|---|---|---|
| CN | 103360690 A | 10/2013 |
| DE | 19900489 A1 | 7/2000 |
| DE | 19940692 A1 | 3/2001 |
| DE | 60000314 T2 | 5/2003 |
| DE | 69928388 T2 | 8/2006 |
| DE | 102009028200 A1 | 2/2011 |
| DE | 202010017705 U1 | 5/2012 |
| DE | 102011080223 A1 | 2/2013 |
| DE | 102012221192 A1 | 5/2014 |
| EP | 0751173 A1 | 1/1997 |
| EP | 1655326 A1 | 5/2006 |
| FR | 2975997 A1 | 12/2012 |
| JP | 3633449 B2 | 1/2002 |
| JP | 2004027105 A | 1/2004 |
| JP | 2006077099 A | 3/2006 |
| JP | 2006176668 A | 7/2006 |
| JP | 2011144226 A | 7/2011 |
| JP | 2013076047 A | 4/2013 |
| WO | 90014384 A1 | 11/1990 |
| WO | 2007004184 A1 | 1/2007 |
| WO | 2007039309 A1 | 4/2007 |
| WO | 2008034755 A1 | 3/2008 |
| WO | 2009123793 A1 | 10/2009 |
| WO | 2013017536 A1 | 2/2013 |

OTHER PUBLICATIONS

International Search Report for PCT/EP2015/055885, dated Jul. 9, 2015, 3 pages.
German Search Report for DE102014205330.7, dated Nov. 17, 2014, 5 pages.
European Search Report for EP 15711501, dated Oct. 6, 2017.

*Primary Examiner* — Michael N Orlando
*Assistant Examiner* — Joshel Rivera
(74) *Attorney, Agent, or Firm* — Mary K. Cameron

(57) ABSTRACT

The present application relates to a thermally expandable composition containing an endothermic chemical blowing agent, to shaped bodies containing said composition and to a method for sealing and filling cavities in components, for strengthening or reinforcing components, in particular hollow components, and for bonding movable components using shaped bodies of this type.

17 Claims, No Drawings

THERMALLY EXPANDABLE COMPOSITIONS

The present application relates to a thermally expandable composition containing one or more endothermic chemical blowing agents, to shaped bodies containing said composition and to a method for sealing and filling cavities in components, for strengthening or reinforcing components, in particular hollow components, and for bonding movable components using shaped bodies of this type.

Modern vehicles and vehicle parts have a large number of cavities that have to be sealed in order to prevent the ingress of moisture and dirt since this can lead to corrosion of said body parts from the inside. This particularly applies to modern self-supporting body constructions, in which a heavy frame structure is replaced by lightweight, structurally rigid frame scaffolds made of prefabricated cavity profiles. These types of construction systemically comprise a series of cavities that have to be sealed against the ingress of moisture and dirt. Such seals additionally serve to avoid the transmission of airborne sound in such cavities and thereby reduce unpleasant vehicle running noise and wind noise and consequently increase the driving comfort in the vehicle.

Baffle parts that provide a sealing and/or acoustic effect in such cavities are often referred to as "pillar fillers", "baffles" or "acoustic baffles". They generally consist either entirely of thermally expandable shaped bodies or of shaped bodies containing a carrier and expandable polymer compositions in their peripheral region. These baffle parts are fastened in the body shell by hanging, clipping, screwing or welding to the open structures. After the structures in the body shell have been closed and after the other pretreatments of the body, the process heat from the oven for curing the cathodic dip coating is then used to trigger the expansion of the expandable portion of the baffle part in order thus to seal the cross-section of the cavity.

In modern vehicles, lightweight metal components are increasingly often also becoming necessary for achieving dimensionally consistent mass production with the predefined rigidity and structural strength. Particularly in vehicle construction, to achieve the desired weight saving, there is a need for lightweight metal components made of thin-walled sheet metal which nevertheless have sufficient rigidity and structural strength. Here, too, use is made of shaped bodies made of thermally expandable compositions which provide the necessary support properties.

Such thermally expandable compositions are described for example in the documents WO 2008/034755, WO 2007/039309, WO 2013/017536 and in the German application 10 2012 221 192.6. These thermally expandable compositions are also used in the automobile sector.

In such expandable compositions, such as for example rubber vulcanizates (sulfur, peroxide or benzoquinone dioxime) for sealing and bonding, ethylene vinyl acetate-based cavity sealing systems, epoxy-based protective foams and expandable sealing compounds in the automobile sector, use is being made at present of exothermic blowing agents, such as for example ADCA (azodicarbonamide), OBSH (4,4'-oxybis(benzenesulfonyl hydrazide)), DNPT (dinitrosopentamethylene tetramine), PTSS (p-toluene semicarbazide), BSH (benzene-4-sulfonohydrazide), TSH (toluene-4-sulfonohydrazide), 5-PT (5-phenyltetrazole) and the like.

These blowing agents have the disadvantage that they can trigger respiratory sensitization, are generally questionable from a toxicological point of view, or are explosive. In addition, during the decomposition thereof, byproducts are produced such as ammonia, formamide, formaldehyde or nitrosamines, which are banned in automobile construction as per the Global Automotive Declarable Substance List (GADSL), IFA-KMR list August 2012 or the BGIA report "Index of hazardous substances 2012". In addition, the VOC content (Volatile Organic Compound content) is very high when using exothermic blowing agents.

Furthermore, due to the exothermic decomposition and the narrow temperature range of the decomposition temperature of the above blowing agents, the foam structure depends on the curing/foaming temperatures, which usually lie in the range from 140 to 220° C., and may vary to a very considerable extent depending on the temperature range. As a result, the expansion rate and the foam structure fluctuate between the minimum and maximum process temperatures. The foam structure in turn influences the absorption of water at different curing temperatures, which particularly in the case of large-pore foams may be very high. The aforementioned blowing agents cannot effectively be used at temperatures below 140° C.

The object of the present invention was therefore to provide thermally expandable compounds which do not require the aforementioned exothermic blowing agents but are suitable for the above-described uses in the same way as the known compounds.

It has now been found that thermally expandable compositions which contain an endothermic blowing agent instead of the known exothermic blowing agents overcome the known disadvantages and at the same time largely satisfy the requirements placed on such thermally expandable compositions.

A first subject matter of the present invention therefore relates to thermally expandable compositions containing an endothermic chemical blowing agent, in particular selected from bicarbonates, solid, optionally functionalized, polycarboxylic acids and salts and mixtures thereof, at least one reactive binder and at least one curing agent and/or accelerator, wherein the reactive binder is preferably selected from the group consisting of epoxies, rubbers and peroxide-crosslinkable polymers.

These endothermic blowing agents have the advantage that they are neither harmful to health nor explosive, and smaller amounts of volatile organic compounds (VOCs) are produced during the expansion. The decomposition products are essentially $CO_2$ and water. Furthermore, the products produced therewith have a more uniform foam structure over the entire process temperature range used for the curing. This may also result in a lower degree of water absorption. Finally, the decomposition temperature of the endothermic blowing agents, particularly of mixtures thereof, is lower than conventional exothermic blowing agents and therefore the process temperature can be reduced and energy can be saved.

According to the invention, a chemical blowing agent will be understood to mean a compound which breaks down under the effect of heat and thereby releases gases.

Suitable bicarbonates (hydrogen carbonates) are those of the formula $XHCO_3$, wherein X may be any cation, in particular an alkali metal ion, preferably $Na^+$ or $K^+$, extreme preference being given to $Na^+$. Other suitable cations $X^+$ may be selected from $NH_4^+$, $\frac{1}{2}Zn^{2+}$, $\frac{1}{2}Mg^{2+}$, $\frac{1}{2}Ca^{2+}$ and mixtures thereof.

Suitable polycarboxylic acids include, but are not limited to, solid, organic di-, tri- or tetraacids, in particular hydroxyl-functionalized or unsaturated di-, tri-, tetra- or polycarboxylic acids, such as for example citric acid, tartaric acid, malic acid, fumaric acid and maleic acid. The use of citric acid is particularly preferred. Among other reasons, citric acid is advantageous because it is an ecologically sustainable blowing agent.

Also suitable are the salts of the aforementioned acids as well as mixtures of two or more of the described compounds. In the case of salts of polycarboxylic acids, the counter-ion is preferably selected from $Na^+$, $K^+$, $NH_4^+$, $½Zn^{2+}$, $½Mg^{2+}$, $½Ca^{2+}$ and mixtures thereof, preference being given to $Na^+$ and $K^+$ particularly $Na^+$. In particular, the salts of polycarboxylic acids have decomposition temperatures shifted toward higher temperatures, so that a broader temperature interval of the decomposition can be achieved by mixing.

When using polycarboxylic acids, use can preferably also be made of carbonates in addition. In this case, preference is given to a mixture of hydrogen carbonates and carbonates along with polycarboxylic acids, as a result of which different activation stages and decomposition reactions can be set in a targeted manner.

Particularly preferred blowing agents are sodium bicarbonate and/or citric acid/citrate. With very particular preference, the blowing agent is a mixture of sodium bicarbonate and citric acid/citrate. Compared to conventional exothermic blowing agents such as ADCA or OBSH, such a mixture has a very low start temperature of just 120-140° C., whereas OBSH has a start temperature of 140-160° C. and ADCA activated with zinc salts has a start temperature of 160-170° C. and not activated even has a start temperature of 210-220° C.

The blowing agents may also contain further additives, such as in particular calcium oxide. Calcium oxide may in this case be used for activation purposes.

In different embodiments, the thermally expandable compositions contain the blowing agent in an amount of 0.1 to 35% by weight, preferably 1 to 30% by weight, more preferably 2 to 30% by weight, particularly preferably 5 to 25% by weight, very particularly preferably 10 to 25% by weight, based on the total composition. Unless described otherwise, the % by weight relates to the total composition prior to expansion.

Preferably, the expandable compositions are free of ADCA (azodicarbonamide) and OBSH (4,4'-oxybis(benzenesulfonyl hydrazide), in particular free of ADCA (azodicarbonamide), OBSH (4,4'-oxybis(benzenesulfonyl hydrazide)), DNPT (dinitrosopentamethylene tetramine), PTSS (p-toluene semicarbazide), BSH (benzene-4-sulfonohydrazide), TSH (toluene-4-sulfonohydrazide) and 5-PT (5-phenyltetrazole), particularly preferably free of exothermic blowing agents. As used in this context, "free of" means that the amount of the stated substance in the reaction mixture is less than 0.05% by weight, preferably less than 0.01% by weight, more preferably less than 0.001% by weight, based on the total weight of the reaction mixture, and in particular entirely free.

The thermally expandable compositions described herein generally contain, in addition to the blowing agents described above, at least one reactive binder and at least one curing agent and/or accelerator.

The curing agent and/or accelerator is preferably generally present in an amount of, in total, at least 0.25% by weight and in particular at least 1.5% by weight, based on the total composition. However, more than 5% by weight in total relative to the total weight of the composition is generally not necessary. However, the proportion of curing agent and/or accelerator may vary greatly depending on the system used.

Preferably, the curing agent is selected such that the crosslinking temperature T90 of the system with the curing agent is below, preferably 15-35° C. below, the decomposition temperature of the endothermic blowing agent. This promotes a high gas yield and thus a high degree of expansion of the material. Exemplary embodiments would be a peroxide (T90=105° C.) with a sodium bicarbonate decomposition start temperature of 130° C. or a peroxide (T90=170° C.) with a citric acid decomposition start temperature of 195° C.

The decomposition temperature of the endothermic blowing agent indicates the temperature at which the endothermic blowing agent starts to decompose, which can also be referred to as the activation temperature. The crosslinking temperature T90 is defined as the temperature at which a 90% crosslinking of the material is achieved within 12 minutes. The crosslinking temperature T90 and the degree of crosslinking can be determined by way of a rheometer measurement, such as with a Monsanto Rheometer 100 S (oscillating disk principle with a deflection angle of 3°, chamber volume approximately 15 $cm^3$) according to DIN 53529.

The proportion of reactive binder in the total composition may generally be in the range from 2 to 65% by weight. However, the proportion of binder may vary greatly depending on the system used. Preferred reactive binders for the thermally expandable compositions are selected from the group consisting of epoxies, rubbers and peroxide-crosslinkable polymers.

In one preferred embodiment, such as for formulations which expand at low temperature, the reactive binders have a melting point (which can be determined by means of DSC according to ASTM D3417) below the decomposition temperature of the endothermic blowing agent. In one advantageous embodiment, for example for formulations which expand at low temperature, the endothermic blowing agents have a decomposition temperature below 175° C., preferably between 175 and 120° C., and the at least one reactive binder has a melting point below 100° C., preferably between 75 and 55° C., and/or a melt flow index MFI of greater than 6 g/10 min, preferably between 10 and 6 g/10 min. In another advantageous embodiment, for example for formulations which expand at high temperature, the endothermic blowing agents have a decomposition temperature above 175° C., preferably between 175 and 240° C., and the at least one reactive binder has a melting point below 125° C., preferably between 100 and 80° C., and/or a melt flow index MFI of less than 6 g/10 min, preferably between 1.5 and 6 g/10 min. In both embodiments, it is preferred in each case that the reactive binder has both the stated melting point and the stated MFI.

One preferred subject matter contains epoxies as the reactive binder. A large number of polyepoxides which have at least two 1,2-epoxy groups per molecule are suitable as epoxy resins. The epoxy equivalent of said polyepoxides may vary between 150 and 50,000, preferably between 170 and 5000. The polyepoxides may in principle be saturated, unsaturated, cyclic or acyclic, aliphatic, alicyclic, aromatic or heterocyclic polyepoxide compounds. Examples of suitable polyepoxides include the polyglycidyl ethers, which are prepared by reacting epichlorohydrin or epibromohydrin with a polyphenol in the presence of alkali. Polyphenols suitable for this are for example resorcinol, catechol, hydroquinone, bisphenol A (bis-(4-hydroxyphenyl)-2,2-propane), bisphenol F (bis-(4-hydroxyphenyl)methane), bis-(4-hydroxyphenyl)-1,1-isobutane; 4,4'-dihydroxybenzophenone, bis-(4-hydroxyphenyl)-1,1- ethane, 1,5-hydroxynaphthalene. Other suitable polyphenols as a basis for the polyglycidyl ethers are the known condensation products of phenol and formaldehyde or acetaldehyde of the novolac resin type.

Further polyepoxides which are suitable in principle are the polyglycidyl ethers of polyalcohols or diamines. These polyglycidyl ethers are derived from polyalcohols such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Further polyepoxides are polyglycidyl esters of polycarboxylic acids, for example reaction products of glycidol or epichlorohydrin with aliphatic or aromatic polycarboxylic acids such as oxalic acid, succinic acid, glutaric acid, terephthalic acid or dimer fatty acid.

Further epoxies are derived from the epoxidation products of olefinically unsaturated cycloaliphatic compounds or from natural oils and fats.

Depending on the intended use, it may be preferred that the composition additionally contains at least one elasticity-increasing resin. This may likewise be an epoxy resin. As elasticity-increasing epoxy resins, use may be made of the known adducts of carboxyl-terminated butadiene/acrylonitrile copolymers (CTBN) and liquid epoxy resins based on the diglycidyl ether of bisphenol A. Specific examples are the reaction products of Hycar CTBN 1300 X8, 1300 X13 or 1300 X15 from the company B. F. Goodrich with liquid epoxy resins. The reaction products of amino-terminated polyalkylene glycols (Jeffamine) with an excess of liquid polyepoxides can also be used. In principle, reaction products of mercapto-functional prepolymers or liquid Thiokol polymers with an excess of polyepoxides can also be used according to the invention as elasticity-increasing epoxy resins. However, very particular preference is given to the reaction products of polymeric fatty acids, in particular of dimer fatty acid with epichlorohydrin, glycidol or in particular the diglycidyl ether of bisphenol A (DGBA).

As heat-activatable or latent curing agents for the epoxy resin/binder system consisting of the aforementioned components, use may be made of guanidines, substituted guanidines, substituted ureas, melamine resins, guanamine derivatives, cyclic tertiary amines, aromatic amines and/or mixtures thereof. The curing agents may be stoichiometrically included in the curing reaction. However, they may also be catalytically active. Examples of substituted guanidines are methyl guanidine, dimethyl guanidine, trimethyl guanidine, tetramethyl guanidine, methyl isobiguanidine, dimethyl isobiguanidine, tetramethyl isobiguanidine, hexamethyl isobiguanidine, heptamethyl isobiguanidine and, most particularly, cyanoguanidine (dicyanodiamide). As representatives of suitable guanamine derivatives, mention may be made of alkylated benzoguanamine resins, benzoguanamine resins or methoxymethyl ethoxymethyl benzoguanamine. For one-component, heat-curing shaped bodies, the selection criterion is the low solubility of said substances at room temperature in the resin system, so that preference is given here to solid, finely ground curing agents. Dicyandiamide is particularly suitable. A good storage stability of the heat-curable shaped bodies is thus ensured.

In addition to or instead of the aforementioned curing agents, use may be made of catalytically active substituted ureas. These are, in particular, p-chlorophenyl-N,N-dimethyl urea (Monuron), 3-phenyl-1,1-dimethyl urea (Fenuron) or 3,4-dichlorophenyl-N,N-dimethyl urea (Diuron). In principle, use may also be made of catalytically active tertiary acryl- or alkylamines, such as for example benzyl dimethyl amine, tris(dimethylamino)phenol, piperidine or piperidine derivatives. However, many of these have too high a solubility in the adhesive system, so that in this case no useful storage stability of the one-component system is achieved. Furthermore, use may also be made of various, preferably solid, imidazole derivatives as catalytically active accelerators. As representatives, mention may be made of 2-ethyl-2-methylimidazole, N-butylimidazole, benzimidazole and N—$C_{1-12}$-alkylimidazoles or N-arylimidazoles. Particular preference is given to the use of a combination of curing agent and accelerator in the form of so-called accelerated dicyandiamides in finely ground form. This obviates the need for separate addition of catalytically active accelerators to the epoxy curing system.

To improve the impact strength, one or more so-called "impact modifiers" may also be present, as are known for this purpose in the prior art. Examples are thermoplastic resins which preferably carry groups reactive to epoxy groups. Also suitable for this purpose are natural or synthetic rubbers. Specific examples of these can be found in the document WO 2007/004184 in paragraphs [27] and [28] (pages 6 and 7).

Another preferred subject matter contains at least one reactive binder based on natural and/or synthetic rubbers. Besides the reactive binders based on natural and/or synthetic rubbers (that is to say elastomers containing an olefinic double bond), the composition preferably contains at least one vulcanizing agent. In one preferred embodiment of thermally expandable compositions based on natural and/or synthetic rubbers, the composition contains:

0-10% by weight, preferably 1-10% by weight, solid rubber(s) having a molecular weight of 100,000 or above 5-50% by weight liquid polyene(s) having a molecular weight of less than 20,000 and a vulcanization system consisting of sulfur and one or more organic accelerator(s) and/or metal oxide(s).

Liquid rubbers or elastomers may be selected from the following group of homopolymers and/or copolymers: polybutadienes, in particular 1,4- and 1,2-polybutadienes, polybutenes, polyisobutylenes, 1,4- and 3,4-polyisoprenes, styrene/butadiene copolymers, butadiene/acrylonitrile copolymers, wherein these polymers may have terminal and/or (statistically distributed) lateral functional groups. Examples of such functional groups are hydroxyl, amino, carboxyl, carboxylic anhydride or epoxy groups. The weight-average molecular weight Mw of these liquid rubbers is typically below 20,000 g/mol, preferably between 900 and 10,000 (measured by means of GPC against a polystyrene standard).

The proportion of liquid rubber in the total composition depends on the desired rheology of the uncured composition and on the desired mechanical properties of the cured composition. The proportion of liquid rubber or elastomer normally varies between 5 and 50% by weight of the total formulation. It has proven to be advantageous in this regard preferably to use mixtures of liquid rubbers of different molecular weight and of different configuration in terms of the remaining double bonds. To achieve optimal adhesion to the various substrates, a liquid rubber component containing hydroxyl groups or anhydride groups is proportionally used in the particularly preferred formulations. At least one of the liquid rubbers should have a high proportion of cis-1,4 double bonds, while another should have a high proportion of vinyl double bonds.

Compared to liquid rubbers, suitable solid rubbers have a significantly higher molecular weight (Mw=100,000 or higher). Examples of suitable rubbers are polybutadiene, preferably with a very high proportion of cis-1,4 double bonds (typically above 95%), styrene/butadiene rubber, butadiene/acrylonitrile rubber, synthetic or natural isoprene rubber, butyl rubber or polyurethane rubber.

Many vulcanization systems based on elemental sulfur and also vulcanization systems with no elemental sulfur are suitable for the compositions based on natural and/or synthetic rubbers. Vulcanization systems with no elemental sulfur include those based on thiuram disulfides and peroxides. Particular preference is given to vulcanization systems based on elemental sulfur and organic vulcanization accelerators and also zinc compounds. In this case, the pulverulent sulfur is used in amounts of 0.1 to 15% by weight, based on the total composition. Use is particularly preferably made of amounts between 0.2 and 8% by weight, very particularly preferably between 1 and 4% by weight. Suitable organic accelerators are the dithiocarbamates (in the form of their ammonium or metal salts), xanthogenates, thiuram compounds (monosulfides and disulfides), thiazole compounds, aldehyde/amine accelerators (for example hexamethylenetetramine) and also guanidine accelerators. Dibenzothiazyl disulfide (MBTS) is used with very particular preference. A combined vulcanization system consisting of elemental sulfur, the accelerators mentioned above and a quinone oxime, such as p-benzoquinone dioxime, or a nitrosobenzene compound, such as p-dinitrosobenzene, is also used with preference. The organic accelerators are used in amounts between 0.5 and 8% by weight, based on the total formulation, preferably between 1 and 3% by weight. In the case of zinc compounds acting as accelerators, a choice may be made between the zinc salts of fatty acids, zinc dithiocarbamates, basic zinc carbonates and, in particular, fine-particle zinc oxide. The content of zinc compounds is in the range between 0.5 and 10% by weight, preferably between 1 and 5% by weight. In addition, other typical rubber vulcanizing aids, such as for example fatty acids (for example stearic acid), may be present in the formulation.

However, the vulcanization system may also be free of elemental sulfur. By way of example, peroxides, preferably organic peroxides, may be used as the vulcanization system. Examples are: Examples and preferred peroxides are those mentioned below. The amount of peroxide used is preferably 0.3 to 4.5% by weight, based on the total composition.

Although these compositions generally already have very good adhesion to substrates due to the content of liquid rubber containing functional groups, nevertheless tackifiers and/or adhesion promoters may be added if necessary. Suitable tackifiers and/or adhesion promoters are for example hydrocarbon resins, phenolic resins, terpene phenolic resins, resorcinol resins or derivatives thereof, modified or unmodified resin acids or esters (abietic acid derivatives), polyamines, polyaminoamides, anhydrides and anhydride-containing copolymers. The addition of polyepoxide resins in small amounts (<1% by weight) can also improve adhesion to some substrates. To this end, however, preferably the solid epoxy resins having a molecular weight considerably greater than 700 are used in finely ground form so that the formulations are still substantially free of epoxy resins, particularly those having a molecular weight below 700. If tackifiers and/or adhesion promoters are used, the type and amount thereof depends on the polymer composition of the adhesive/sealant, on the desired strength of the cured composition and on the substrate to which the composition will be applied. Typical tackifying resins (tackifiers), such as for example terpene phenolic resins or resin acid derivatives, are normally used in concentrations between 5 and 20% by weight; typical adhesion promoters, such as polyamines, polyaminoamides or resorcinol derivatives, are used in a range between 0.1 and 10% by weight.

In another preferred embodiment of thermally expandable compositions based on natural and/or synthetic rubbers, the compositions contain 15 to 70% by weight, preferably 20 to 40% by weight, of at least one thermoplastic elastomer, preferably a styrene/butadiene or styrene/isoprene block copolymer;

5 to 40% by weight, preferably 10 to 20% by weight, of at least one non-elastomeric thermoplastic (preferably an ethylene/vinyl acetate or ethylene/methyl acrylate copolymer) and 0.1 to 4% by weight of one or more vulcanizing agents, preference being given to those mentioned above, particularly sulfur.

The compositions may preferably also contain the following components, individually or in combination:

0.01 to 2% by weight, preferably 0.05 to 1% by weight, of at least one stabilizer or antioxidant;

0.1 to 15% by weight, preferably 2 to 10% by weight, of at least one tackifying resin;

0.1 to 15% by weight, preferably 2 to 10% by weight, of at least one plasticizer;

0.5 and 8% by weight, preferably between 1 and 3% by weight, of at least one organic accelerator, particularly those mentioned above;

0.5 and 10% by weight, preferably between 1 and 5% by weight, of at least one zinc compound acting as accelerator, in particular fine-particle zinc oxide.

The percentages here are expressed as percentages by weight based on the total weight of the thermally expandable material.

Use is preferably made of a thermoplastic elastomer which has a softening point not higher than the temperature at which the blowing agent starts to be activated. Preferably, the softening point is at least around 30° C. lower than the activation temperature of the blowing agent. The softening point is determined by means of DSC.

The thermoplastic elastomer is preferably selected from the group consisting of thermoplastic polyurethanes (TPU) and block copolymers (including linear and radial block copolymers) of the A-B, A-B-A, A-(B-A)n-B and (A-B)n-Y types, where A is an aromatic polyvinyl ("hard") block and the B block is a rubber-like ("soft") block consisting of polybutadiene, polyisoprene or the like, which may be partially hydrogenated or is fully hydrogenated, Y is a polyfunctional compound and n is an integer of at least 3. The hydrogenation of the B block removes originally present double bonds and increases the thermal stability of the block copolymer. Preferably, however, there is no hydrogenation.

Suitable block copolymers include, but are not limited to, SBS (styrene/butadiene/styrene) copolymers, SIS (styrene/isoprene/styrene) copolymers, SEPS (styrene/ethylene/propylene/styrene) copolymers, SEEPS (styrene/ethylene/ethylene/propylene/styrene) or SEBS (styrene/ethylene/butadiene/styrene) copolymers. Particularly suitable block copolymers are styrene/isoprene/styrene triblock polymers, and also fully or partially hydrogenated derivatives thereof, the polyisoprene block preferably containing a relatively high proportion of monomer units derived from isoprene having a 1,2 and/or 3,4 configuration.

Preferably, at least around 50% of the polymerized isoprene monomer units are polymerized into a 1,2 and/or 3,4 configuration, the remainder of the isoprene units having a 1,4 configuration. Such block copolymers are available for example from Kuraray Co., Ltd under the trade name HYBRAR.

In certain preferred embodiments of the invention, the "hard" blocks have a proportion by weight of around 15 to around 30% by weight of the block copolymer and the "soft" blocks have a proportion by weight of around 70 to around 85% by weight of the block copolymer.

The glass transition temperature of the "soft" blocks is preferably around −80° C. to around 10° C., while the glass transition temperature of the "hard" blocks is preferably around 90° C. to around 110° C. The melt flow index of the block copolymer is preferably around 0.5 to around 6 g/10 min (measured according to ASTM D1238, 190° C., 2.16 kg). The block copolymer preferably has a number-average molecular weight of around 30,000 to around 300,000, measured by means of GPC against a polystyrene standard.

As thermoplastic elastomers, use may also be made of thermoplastic polyurethanes (TPU) and also other block copolymers which contain hard and soft segments, such as for example polystyrene/polydimethylsiloxane block copolymers, polysulfone/polydimethylsiloxane block copolymers, polyester/polyether block copolymers (for example copolyesters such the one composed of dimethyl terephthalate, poly(tetramethylene oxide) glycol and tetramethylene glycol), polycarbonate/polydimethylsiloxane block copolymers and polycarbonate/polyether block copolymers.

Thermoplastic elastomers which are not block copolymers are usually finely interdispersed multiphase systems or alloys and can also be used, including mixtures of polypropylene with ethylene propylene rubbers (EPR) or ethylene propylene diene monomer (EPDM) rubbers.

In this embodiment with one or more thermoplastic elastomers, the expandable material preferably contains one or more non-elastomeric thermoplastics. In this case, the non-elastomeric thermoplastic is chosen inter alia to improve the adhesion properties and processability of the expandable composition.

In general, it is desirable to use a non-elastomeric thermoplastic which has a softening point not higher than the temperature at which the blowing agent starts to be activated, preferably at least around 30° C. lower than this temperature.

The particularly preferred non-elastomeric thermoplastics include olefin polymers, in particular copolymers of olefins (for example ethylene) with non-olefinic monomers (for example vinyl esters, such as vinyl acetate and vinyl propionate, (meth)acrylate esters, such as C1 to C6 alkyl esters of acrylic acid and methacrylic acid), ethylene/vinyl acetate copolymers (especially copolymers containing around 16 to around 35% by weight vinyl acetate) and ethylene/methyl acrylate copolymers (in particular copolymers containing around 15 to around 35% by weight methyl acrylate).

In particular refinements of this embodiment, the weight ratio of thermoplastic elastomer to non-elastomeric thermoplastic is at least 0.5:1 or at least 1:1 and/or is not more than 5:1 or 2.5:1.

The tackifying resin may be selected from the group consisting of colophonium, terpene resins, terpene phenolic resins, hydrocarbon resins, aromatic tackifying resins originating from cracked crude oil distillates, tall oil, ketone resins and aldehyde resins. Suitable colophonium resins are in particular from abietic acid, levopimaric acid, neoabietic acid, dextropimaric acid, palustric acid, alkyl esters of the aforementioned resin acids and hydrogenated products of resin acid derivatives.

Examples of suitable plasticizers are alkyl esters of dibasic acids (for example phthalate esters), diaryl ethers, benzoates of polyalkylene glycols, organic phosphates and alkylsulfonic acid esters of phenol or cresol.

A very particularly preferred subject matter of the invention contains, besides the endothermic blowing agent in the thermally expandable compositions, at least one peroxide-crosslinkable polymer as binder system and at least one peroxide as curing agent.

In principle, all thermoplastic polymers and thermoplastic elastomers which can be peroxide-crosslinked are suitable as peroxide-crosslinkable polymers. The term "peroxide-crosslinkable" is used by a person skilled in the art to refer to those polymers in which, through the action of a radical initiator, a hydrogen atom can be abstracted from the main chain or a side chain so as to leave behind a radical which attacks other polymer chains in a second reaction step.

In a preferred embodiment, the at least one peroxide-crosslinkable polymer is selected from styrene/butadiene block copolymers, styrene/isoprene block copolymers, ethylene/vinyl acetate copolymers, functionalized ethylene/vinyl acetate copolymers, functionalized ethylene/butyl acrylate copolymers, ethylene/methyl acrylate copolymers, ethylene/ethyl acrylate copolymers, ethylene/butyl acrylate copolymers, ethylene/(meth)acrylic acid copolymers, ethylene/2-ethylhexyl acrylate copolymers, ethylene/acrylic ester copolymers and polyolefins, such as for example polyethylene or polypropylene.

According to the invention, a functionalized copolymer will be understood to mean a copolymer which is provided with additional hydroxide groups, carboxy groups, anhydride groups, acrylate groups and/or glycidyl methacrylate groups.

Ethylene/vinyl acetate copolymers, functionalized ethylene/vinyl acetate copolymers, functionalized ethylene/butyl acrylate copolymers, ethylene/propylene/diene copolymers, styrene/butadiene block copolymers, styrene/isoprene block copolymers, ethylene/methyl acrylate copolymers, ethylene/ethyl acrylate copolymers, ethylene/butyl acrylate copolymers and ethylene/(meth)acrylic acid copolymers are particularly advantageous in the context of the present invention.

Particularly good adhesion properties, particularly on oiled sheet metal, can be achieved if according to the invention use is made of thermally curable preparations which contain one or more ethylene/vinyl acetate copolymers as the only peroxide-curable polymer, that is to say that the thermally curable preparations are essentially free of further peroxide-curable polymers apart from the ethylene/vinyl acetate copolymers.

According to the invention, thermally expandable preparations are "essentially free of further peroxide-curable polymers" if they contain less than 3% by weight, preferably less than 1.5% by weight, very particularly preferably less than 0.5% by weight of a peroxide-crosslinkable polymer that is not an ethylene/vinyl acetate copolymer.

According to the invention, particular preference is given to thermally expandable preparations which contain at least one ethylene/vinyl acetate copolymer having a vinyl acetate content of 9 to 30% by weight, in particular 15 to 20% by weight, very particularly 17.5 to 19% by weight, based on the total weight of the copolymer.

Furthermore, it has proven to be advantageous if the thermally expandable preparation contains a peroxide-crosslinkable polymer, in particular an ethylene/vinyl acetate copolymer, having a melt flow index of 0.3 to 400 g/10 min, in particular 0.5 to 45 g/10 min. Peroxide-crosslinkable polymers, in particular ethylene/vinyl acetate copolymers, having a melt flow index of 1.5 to 25 g/10 min, in particular 2 to 10 g/10 min, very particularly 2 to 8 g/10 min are advantageous. According to the invention, it may be advantageous if two or more polymers having different melt flow indices are used in the thermally expandable preparations.

To this end, the melt flow index is determined in a capillary rheometer, the polymer being melted at 190° C. in a heatable cylinder and being pressed through a defined die (capillary) under a pressure resulting from the applied load (2.16 kg) (ASTM D1238). The exiting mass is determined as a function of time.

The thermally expandable preparations preferably contain at least 30% by weight of at least one peroxide-crosslinkable polymer. Particular preference is given to thermally expandable preparations which contain 40 to 90% by weight, in particular 50 to 80% by weight, of at least one peroxide-crosslinkable polymer, in each case based on the total weight of the thermally expandable preparation.

Besides the peroxide-crosslinkable polymers, the thermally expandable preparations may preferably contain at least one multifunctional acrylate of low molecular weight as a further constituent.

A "multifunctional acrylate of low molecular weight" will be understood to mean a compound which has at least two acrylate groups and has a molecular weight below 2400 g/mol, preferably below 800 g/mol. Such compounds which have two, three or more acrylate groups per molecule have proven to be particularly advantageous.

Preferred difunctional acrylates are ethylene glycol dimethacrylate, diethylene glycol dimethacrylate, triethylene glycol dimethacrylate, triethylene glycol diacrylate, tripropylene glycol dimethacrylate, 1,4-butanediol dimethacrylate, 1,3-butylene glycol dimethacrylate, 1,3-butanediol dimethacrylate, tricyclodecane dimethanol dimethacrylate, 1,10-dodecanediol dimethacrylate, 1,6-hexanediol dimethacrylate, 2-methyl-1,8-octanediol dimethacrylate, 1,9-nonanediol dimethacrylate, neopentyl glycol dimethacrylate and polybutylene glycol dimethacrylate.

Preferred acrylates of low molecular weight having three or more acrylate groups are glycerol triacrylate, dipentaerythritol hexaacrylate, pentaerythritol triacrylate (TMM), tetramethylolmethane tetraacrylate (TMMT), trimethylolpropane triacrylate (TMPTA), pentaerythritol trimethacrylate, di(trimethylolpropane) tetraacrylate (TMPA), pentaerythritol tetraacrylate, trimethylolpropane trimethacrylate (TMPTMA), tri(2-acryloxyethyl) isocyanurate and tri(2-methacryloxyethyl) trimellitate as well as the ethoxylated and propoxylated derivatives thereof containing at most 35 EO units and/or at most 20 PO units.

According to the invention, very particular preference is given to thermally expandable preparations which contain a multifunctional acrylate of low molecular weight selected from triethylene glycol diacrylate, triethylene glycol dimethacrylate, trimethylolpropane triacrylate (TMPTA) and trimethylolpropane trimethacrylate (TMPTMA), pentaerythritol triacrylate (TMM), tetramethylolmethane tetraacrylate (TMMT), pentaerythritol trimethacrylate, di(trimethylolpropane) tetraacrylate (TMPA) and pentaerythritol tetraacrylate.

Besides the acrylates of low molecular weight, the thermally expandable preparations may contain further co-crosslinkers, such as for example allyl compounds, such as triallyl cyanurate, triallyl isocyanurate, triallyl trimesate, triallyl trimellitate (TATM), tetraallyl pyromellitate, the diallyl ester of 1,1,3-trimethyl-5-carboxy-3-(4-carboxyphenyl) indene, trimethylolpropane trimellitate (TMPTM) or phenylene dimaleimide.

In this case, it has proven to be particularly advantageous if the thermally expandable preparations contain at least one multifunctional acrylate of low molecular weight selected from triethylene glycol diacrylate, trimethylolpropane triacrylate (TMPTA) and trimethylolpropane trimethacrylate (TMPTMA).

The multifunctional acrylates of low molecular weight are contained in the thermally expandable preparations preferably in an amount of 0.2 to 2.5% by weight, in particular 0.4 to 1.4% by weight, in each case based on the total weight of the thermally expandable preparation.

As a curing agent system for the peroxide-crosslinkable polymers, the thermally expandable preparations preferably contain at least one peroxide. Particularly suitable with preference are the organic peroxides, such as for example ketone peroxides, diacyl peroxides, peresters, perketals and hydroperoxides. Particular preference is given for example to cumene hydroperoxide, t-butyl peroxide, bis(tert-butylperoxy)diisopropylbenzene, di-(tert-butylperoxyisopropyl) benzene, dicumyl peroxide, t-butyl peroxybenzoate, dialkyl peroxydicarbonate, diperoxy ketals (for example 1,1-di-tert-butylperoxy-3,3,5-trimethylcyclohexane), ketone peroxides (for example methyl ethyl ketone peroxides) and 4,4-di-tert-butylperoxy-n-butyl valerate.

Particular preference is given to the peroxides which are marketed commercially for example by the company Akzo Nobel, such as 3,3,5,7,7-pentamethyl-1,2,4-trioxepan, 2,5-dimethyl-2,5-di-(tert-butylperoxy)hex-3-yne, di-tert-butyl peroxide, 2,5-dimethyl-2,5-di-(tert-butylperoxy)hexane, tert-butyl cumyl peroxide, di-(tert-butylperoxyisopropyl) benzene, dicumyl peroxide, butyl-4,4-di-(tert-butylperoxy) valerate, tert-butylperoxy-2-ethylhexyl carbonate, 1,1-di-(tert-butylperoxy)-3,3,5-trimethylcyclohexane, tert-butyl peroxybenzoate, di-(4-methylbenzoyl) peroxide and dibenzoyl peroxide.

It has also proven to be advantageous if the peroxides used are substantially inert at room temperature and are activated only when heated to relatively high temperatures (for example when heated to temperatures between 130° C. and 240° C.). It is particularly advantageous if the peroxide used has a half-life of more than 60 minutes at 65° C., that is to say that, after heating the thermally expandable preparation containing the peroxide to 65° C. for 60 minutes, less than half of the peroxide used has decomposed. According to the invention, particular preference may be given to those peroxides which have a half-life of 60 minutes at 115° C.

With particular preference, the preparation contains at least one peroxide selected from the group consisting of di-(tert-butylperoxyisopropyl)benzene, dicumyl peroxide, 1,1-di-(tert-butylperoxy)-3,3,5-trimethylcyclohexane, dibenzoyl peroxide and di-tert-butyl-1,1,4,4-tetramethylbut-2-in-1,4-ylene diperoxide.

According to the invention, it is also advantageous if at least one peroxide or the peroxides are used in a form applied to a solid inert carrier, such as for example calcium carbonate and/or silica and/or kaolin.

Preferably, the peroxide is selected such that the crosslinking temperature T90 is below, preferably 15-35° C. below, the decomposition temperature of the endothermic blowing agent. This promotes a high gas yield and thus a high degree of expansion of the material.

Exemplary embodiments would be a peroxide (T90=105° C.) with a sodium bicarbonate decomposition start temperature of 130° C. or a peroxide (T90=170° C.) with a citric acid decomposition start temperature of 195° C. The crosslinking temperature T90 is defined as the temperature at which a 90% crosslinking of the material is achieved within 12 minutes.

The at least one peroxide or the peroxides are contained in the thermally expandable preparations according to the invention preferably in an amount of 0.2 to 2% by weight, in particular in an amount of 0.5 to 1.3% by weight, in each case determined as the active substance content of peroxide based on the total weight of the thermally expandable preparation.

It is also advantageous if the weight ratio of the at least one peroxide to the at least one multifunctional acrylate of low molecular weight is at least 1:3. According to the invention, a weight ratio of at least 1:3 is always achieved if the formulation contains, based on 1 g of peroxide, at most 3 g of multifunctional acrylate of low molecular weight. Particular preference is given to a weight ratio of at least 1:2.5, in particular at least 1:1.6.

By choosing this weight ratio, it is possible according to the invention that the bonding, that is to say the adhesion to the sheet metal located opposite, is improved. It has been found that the thermally expandable preparations according to the invention, particularly in narrow locations of the system to be sealed, exhibit better adhesion since the foam penetrates even into very small corners and tight angles and thus enables a more complete sealing of the system.

Besides the constituents mentioned above, the thermally expandable compounds may also contain further customary components, such as for example fillers, plasticizers, reactive diluents, rheology modifiers, wetting agents, adhesion promoters, anti-aging agents, stabilizers and/or color pigments.

Suitable fillers are for example the various ground or precipitated chalks, calcium magnesium carbonates, talc, graphite, barite, silicic acids or silica as well as in particular siliceous fillers, such as for example mica, for instance in the form of chlorite, or siliceous fillers of the aluminum magnesium calcium silicate type, for example wollastonite. Talc is a particularly preferred filler. With preference, the fillers are coated, preferably with stearic acid or stearates. This has a positive effect on the flow behavior.

The fillers are preferably used in an amount of 0 to 60% by weight, in particular 0 to 50% by weight, preferably 0.1 to 40% by weight, particularly preferably 1 to 30% by weight, in each case based on the weight of the thermally expandable composition as a whole.

Color-imparting components, in particular black colorants based on graphite and/or carbon black, are contained in the thermally expandable compositions according to the invention preferably in an amount of 0 to 2% by weight, in particular 0.1 to 0.8% by weight, very particularly preferably 0.15 to 0.4% by weight, in each case based on the weight of the thermally expandable composition as a whole.

As antioxidants or stabilizers, use may be made for example of sterically hindered phenols and/or sterically hindered thioethers and/or sterically hindered aromatic amines, such as for example bis-(3,3-bis-(4'-hydroxy-3-tert.-butylphenyl)butanoic acid) glycol ester or also 4-methylphenol, reaction product with dicyclopentadiene and isobutylene (Wingstay L).

Antioxidants or stabilizers are contained in the thermally expandable compositions according to the invention preferably in an amount of 0 to 0.5% by weight, in particular 0.1 to 0.3% by weight, in each case based on the weight of the thermally expandable composition as a whole.

Reactive diluents for epoxy resins are epoxy group-containing substances of low viscosity (glycidyl ethers or glycidyl esters) having an aliphatic or aromatic structure. These reactive diluents can serve on the one hand to lower the viscosity of the binder system above the softening point, and on the other hand they can control the pre-gelling process during the injection molding. Typical examples of suitable reactive diluents are mono-, di- or triglycidyl ethers of C6 to C14 monoalcohols or alkylphenols and also the monoglycidyl ether of cashew nut shell oil, diglycidyl ether of ethylene glycol, diethylene glycol, triethylene glycol, tetraethylene glycol, propylene glycol, dipropylene glycol, tripropylene glycol, tetrapropylene glycol, 1,4-butylene glycol, 1,5-pentanediol, 1,6-hexanediol, cyclohexanedimethanol, triglycidyl ether of trimethylolpropane and the glycidyl esters of C6 to C24 carboxylic acids, or mixtures thereof.

The thermally expandable compositions according to the invention are preferably formulated such that they are solid at 22° C. According to the invention, a thermally expandable composition is referred to as "solid" if the geometry of said composition does not deform under the effect of gravity at the stated temperature within 1 hour, in particular within 24 hours.

The thermally expandable compositions according to the invention may be prepared by mixing the selected components in any suitable mixer, such as for example a kneader, a double-Z kneader, an internal mixer, a twin screw mixer, a continuous mixer or an extruder, in particular a twin screw extruder.

Although it may be advantageous to heat the components somewhat in order to facilitate the formation of a homogeneous, uniform mass, care must be taken to ensure that no temperatures are reached that activate the curing agents, the accelerators and/or the blowing agent. Immediately after being prepared, the resulting thermally expandable component can be shaped, for example by blow molding, pelletization, injection molding, compression molding, stamping or extrusion.

The expansion of the thermally expandable composition is brought about by heating, wherein the composition is heated for a particular period of time to a particular temperature that is sufficient to activate the blowing agent. Depending on the make-up of the composition and the conditions of the production line, such temperatures are usually in the range from 110° C. to 240° C., preferably 120° C. to 210° C., with a dwell time of 10 to 90 minutes, preferably 5 to 60 minutes.

In the automobile construction sector, it is particularly advantageous if the expansion of the compositions according to the invention takes place as the vehicle passes through the oven for curing the cathodic dip coating, so that there is no need for a separate heating step.

The thermally expandable compositions of the present invention can be used in a wide range of supporting, filling, sealing and adhesive applications, for example in the field of baffle parts for sealing cavities in vehicles. However, use as a lining adhesive, for example in the door or roof region, is also conceivable. For such an intended use, the thermally expandable compositions according to the invention may be applied by direct extrusion. However, the compositions may also be placed in extruded form at the location of use and pressed on and fused there by heating the steel. As a third alternative, application as a co-extrudate is also conceivable. In this embodiment, according to the invention, a second tacky composition is applied in a thin layer below the actual non-tacky shaped part made of the thermally expandable composition according to the invention. In the context of this embodiment, said second tacky layer serves to fix the shaped part in the shell.

The thermally expandable compositions are accordingly particularly suitable for producing shaped bodies, in particular baffle parts for sealing cavities, that is to say for producing parts which are inserted into the cavities of vehicles, and which then expand under the effect of heat and at the same time cure and in this way seal the cavity as completely as possible.

A second subject matter of the present invention is therefore a shaped body which comprises a thermally expandable composition according to the invention. Said shaped body may be for example a baffle part for sealing cavities of a component, which has a shape adapted to the cavity.

According to the invention, a "shape adapted to the cavity" will be understood to mean all geometries of baffle parts which, after expansion, ensure complete sealing of the cavity. In this regard, the shape of the baffle part may be tailored individually to the shape of the cavity and may have corresponding pointy areas and/or rounded areas. In the case of the thermally expandable compositions according to the invention having high degrees of expansion, however, the introduction of a suitably large amount in variable form, for example in the form of a line or a cut strand of material, into the cavity may be sufficient to ensure a complete sealing of the cavity after expansion.

Such baffle parts are usually produced from the thermally expandable compositions according to the invention by injection molding. In this regard, the thermally expandable compositions are heated to temperatures in the range from 70 to 120° C. and then injected into a suitably shaped mold.

The shaped bodies according to the invention may be used in all products which have cavities. Besides vehicles, these also include for example aircraft, rail vehicles, household appliances, furniture, buildings, walls, partitions or also boats.

Another subject matter of the present invention is a method for sealing and filling cavities in components, for strengthening or reinforcing components, in particular hollow components, and for bonding movable components using the compositions and shaped bodies described herein. The method is preferably a method for sealing cavities in a component, wherein a baffle part according to the invention is inserted into the cavity and then is heated to a temperature above 110° C. so that the thermally expandable composition expands and seals the cavity.

Another subject matter of the present invention is the use of a shaped body or baffle part according to the invention for acoustically sealing cavities in components and/or for sealing cavities in components against water and/or moisture.

Yet another subject matter of the present invention is the use of a shaped body according to the invention for strengthening or reinforcing components, in particular hollow components.

The following examples are intended to explain the invention in greater detail, the choice of examples not being intended to limit the scope of the subject matter of the invention. Unless specified otherwise, all stated amounts for the compositions are percentages by weight.

EXEMPLARY EMBODIMENTS

General Test Procedure/Preparation of the Formulations:

In order to prepare the thermally expandable preparations according to the invention, the solid polymers contained therein were processed at RT in a kneader with fillers until a homogeneous dough was obtained, heating to up to 150° C. if necessary. Liquid polymers and/or resins and further fillers, carbon black, stabilizers and plasticizers were then successively added and kneading was continued until the formulation was smooth.

At below 60° C., all the reactive components such as for example accelerators, peroxides, sulfur, activators and catalysts, zinc oxide, calcium oxide and blowing agents were then added and the mixture was slowly kneaded until the adhesive had been homogeneously mixed. In order to adjust the viscosity, further plasticizers or liquid polymers may be added and kneaded in towards the end of the preparation step.

FOG Analysis

The FOG analysis is a thermodesorption analysis of organic emissions to characterize non-metallic motor vehicle materials according to VDA 278. During this analysis, the volatile substance content of a very small material sample is determined at 120° C. by means of GC Headspace. The organic compounds are determined individually and the content thereof in the total emission is ascertained. Identification takes place using a mass spectrometer.

Determination of the Expansion

In order to determine the expansion, test specimens having the dimensions 40 mm×40 mm×4 mm were cut from the prepared panels of example formulations A, C and D and were placed in a circulating air oven that was heated to the temperatures specified in the tables (heat-up time approximately 7 to 10 min), and the test specimens were then left at this temperature for the length of time specified in the tables. The expansion at 180° C. corresponds to the ideal conditions that are achieved in the context of curing in vehicle construction. The expansion at 160° C. simulates the conditions of under-cure, and the expansion at 200° C. simulates the conditions of over-cure.

Pumpable products consisting of example formulations B are applied in line form to an aluminum sheet (2×4 cm).

The degree of expansion was determined by means of the water displacement method according to the formula $$\text{Expansion} = \frac{m2 - m1}{m1} \times 100$$

m1=mass of the test specimen in the original state in deionized water
m2=mass of the test specimen after curing in deionized water Odor Evaluation To evaluate the odor of the formulations, test specimens were cured for 25 min. at 180° C. and were stored at RT for 24 h. The test specimen is selected such that approximately 50 cm$^3$ of sample material exists after expansion.

For test purposes, the specimen is placed in a 1 l glass and the latter is stored in a tightly closed manner at 80° C. for 2 h. After removal from temperature storage, the test vessel is cooled to a test temperature of around 60° C. before at least 3 people independently evaluate the odor according to the following assessment:
1=imperceptible
2=perceptible, not obtrusive
3=clearly perceptible but not yet obtrusive
4=obtrusive
5=very obtrusive
6=unbearable The arithmetic mean of the individual tests is specified.

Aging Test According to VDA 621-415

The aging test according to VDA 621-415 describes an artificial aging method for adhesive bonds which is standardized in the automobile industry.

24 h salt spray according to DIN EN ISO 9227-NSS (50±5 g/l NaCl, 35±2° C.)

+4 d condensation/alternating climate according to DIN EN ISO 6270-2 (8 h, 40±3° C. at 100% relative humidity+16 h, room temperature 18-28° C.)

+2 d room temperature 18-28° C. according to DIN 50014/ISO 554

=7 d=1 cycle

TABLE 1

| Substance name/ group (generic name) | Example formulation A (solid elastomer, sulfur-crosslinking) | | | | |
|---|---|---|---|---|---|
| | Comparative recipe 1A | Comparative recipe 2A | Recipe 1A according to the invention | Recipe 2A according to the invention | Recipe 3A according to the invention |
| SIS copolymer (20% styrene content, MFI 4 g/10 min (190° C., 2.16 kg), Tg 13° C.) | 11.5 | 11.5 | 11.5 | 11.5 | 11.5 |
| SIS copolymer (20% styrene content, MFI 5 g/10 min (190° C., 2.16 kg), Tg 8° C.) | 18.5 | 18.5 | 18.5 | 18.5 | 18.5 |
| Ethylene/vinyl acetate copolymer (28% VA content, MFI 400 g/10 min (190° C., 2.16 kg)) | 12.5 | 12.5 | 12.5 | 12.5 | 12.5 |
| Talc (BET 3.5 g/m$^2$, 2-20 μm) (filler) | 32 | 29.7 | 29.7 | 29.7 | 29.7 |
| Aliphatic hydrocarbon resin (softening point 97-103° C.) | 8 | 8 | 8 | 8 | 8 |
| Diisononyl phthalate (phthalate plasticizer) | 8 | 8 | 8 | 8 | 8 |
| Zinc oxide (activator for vulcanization) | 2 | 2 | 2 | 2 | 2 |
| 4-Methylphenyl, reaction product with dicyclopentadiene and isobutylene (melting point 115° C.) (antioxidant) | 1 | 1 | 1 | 1 | 1 |
| Carbon black | 0.3 | 0.3 | 0.3 | 0.3 | 0.3 |
| Sulfur (vulcanizing agent) | 0.4 | 0.4 | 0.4 | 0.4 | 0.4 |
| Benzothiazyl-2-dicyclohexylsulfenamide (accelerator from the sulfenamide class) | 0.4 | 0.4 | 0.4 | 0.4 | 0.4 |
| TETRAMETHYL THIURAMDISULFIDE (accelerator from the thiuram class) | 1.2 | 1.2 | 1.2 | 1.2 | 1.2 |
| DIBENZOTHIAZYL DISULFIDE (accelerator from the thiazyl sulfide class) | 0.4 | 0.4 | 0.4 | 0.4 | 0.4 |
| Activated azodicarbonamide (gas yield 220 ml/g, decomposition temp. 205-213° C.) (exothermic blowing agent) | 2.3 | — | 0 | 0 | 0 |
| Diphenyloxide-4,4'-disulfohydrazide (exothermic blowing agent) | — | 4.6 | 0 | 0 | 0 |
| Sodium hydrogen carbonate (endothermic blowing agent) | — | — | 4.6 | — | — |
| Mixture of sodium hydrogen carbonate/ citric acid/citrate (endothermic blowing agent) | — | — | — | 4.6 | — |
| Sodium hydrogen carbonate (endothermic blowing agent) | — | — | — | — | 4.6 |

TABLE 1-continued

Example formulation A (solid elastomer, sulfur-crosslinking)

| Substance name/ group (generic name) | Comparative recipe 1A | Comparative recipe 2A | Recipe 1A according to the invention | Recipe 2A according to the invention | Recipe 3A according to the invention |
|---|---|---|---|---|---|
| Urea (activator for accelerator) | 1.5 | 1.5 | 1.5 | 1.5 | 1.5 |
| TOTAL | 100 | 100 | 100 | 100 | 100 |
| FOG [µg/g] according to VDA 278 | 4030 | 4070 | 2480 | 2219 | — |
| Expansion [%] | | | | | |
| 15 min @ 160° C. | 552 | 391 | 377 | 342 | 304 |
| 25 min @ 180° C. | 596 | 302 | 455 | 380 | 346 |
| 40 min @ 200° C. | 589 | 36 | 473 | 408 | 367 |
| Odor note 1-6 | 4 | 2 | 3 | 3 | 2 |
| Aging 10 cycles VDA 621-415, galvanized zinc, oiling: 3 g/m² Fuchs Anticorit PL 3802-39S | 100% cf | 100% cf | 100% cf | 100% cf | 100% cf |
| Foam structure, optical evaluation | small pores | very large pores, bubbly | medium to large pores | small pores | large pores |

TABLE 2

Example formulation B (standard rubber base, sulfur-crosslinking)

| Substance name/group (generic name) | Comparative recipe 1B | Recipe 1B according to the invention | Recipe 2B according to the invention | Recipe 3B according to the invention | Recipe 4B according to the invention |
|---|---|---|---|---|---|
| Cis-1,4-polybutadiene solid rubber (Mooney viscosity ML 1 + 4, 100° C., 47 MU, 96% cis-1,4) | 7.80 | 7.80 | 7.80 | 7.80 | 7.80 |
| Liquid vinyl-1,2-polybutadiene (Mn 1800, viscosity 400-700 dPas (35° C.), vinyl-1,2 45-55%) | 2.20 | 2.20 | 2.20 | 2.20 | 2.20 |
| Polybutadiene with active carboxyl anhydride groups, Mn 1000, acid content 68-80 mgKOH/g, viscosity 1500-6000 dPas 25° C.) | 1.30 | 1.30 | 1.30 | 1.30 | 1.30 |
| Liquid cis-1,4-polybutadiene (Mn 2600 g/mol, viscosity 700-800 mPas (20° C.), cis-1,4 75%) | 24.48 | 24.48 | 24.48 | 24.48 | 24.48 |
| Liquid cis-1,4-polybutadiene with active carboxyl anhydride groups (Mn 1800-2400 g/mol, viscosity 6000-9000 mPas (20° C.), acid content 70-90 mgKOH/g) | 3.00 | 3.00 | 3.00 | 3.00 | 3.00 |
| Coated chalk | 18.80 | 18.80 | 18.80 | 18.80 | 18.80 |
| Zinc oxide | 1.50 | 1.50 | 1.50 | 1.50 | 1.50 |
| Chalk (filler) | 32.60 | 31.70 | 31.70 | 31.70 | 31.70 |
| Calcium oxide | 2.50 | 2.50 | 2.50 | 2.50 | 2.50 |
| Sulfur (vulcanizing agent) | 2.50 | 2.50 | 2.50 | 2.50 | 2.50 |
| DIBENZOTHIAZYL DISULFIDE (accelerator from the thiazyl sulfide class) | 1.00 | 1.00 | 1.00 | 1.00 | 1.00 |
| Azodicarbonamide (gas yield approx. 220 ml/g) (exothermic blowing agent) | 1.00 | — | — | — | — |
| Sodium hydrogen carbonate (endothermic blowing agent) | — | 2.00 | — | — | — |
| Mixture of sodium hydrogen carbonate/citric acid/citrate (endothermic blowing agent) | — | — | 2.00 | — | — |

TABLE 2-continued

Example formulation B (standard rubber base, sulfur-crosslinking)

| Substance name/group (generic name) | Comparative recipe 1B | Recipe 1B according to the invention | Recipe 2B according to the invention | Recipe 3B according to the invention | Recipe 4B according to the invention |
|---|---|---|---|---|---|
| Sodium hydrogen carbonate (endothermic blowing agent) | — | — | — | 2.00 | — |
| Sodium hydrogen carbonate (endothermic blowing agent) | — | — | — | — | 2.00 |
| Benzenesulfinic acid Zn salt (activator for azodicarbonamide) | 0.10 | — | — | — | — |
| Physical blowing agent (methylbutane in acrylonitrile/methacrylonitrile copolymer, particle size 38-44 μm, start temperature 110-120° C.) | 0.62 | 0.62 | 0.62 | 0.62 | 0.62 |
| 4-Methylphenol, reaction product with dicyclopentadiene and isobutylene (melting point 115° C.) (antioxidant) | 0.30 | 0.30 | 0.30 | 0.30 | 0.30 |
| Carbon black | 0.30 | 0.30 | 0.30 | 0.30 | 0.30 |
| Total | 100.00 | 100.00 | 100.00 | 100.00 | 100.00 |
| Expansion [%] | | | | | |
| 20 min @ 140° C. | 32 | 76 | 60 | 59 | 59 |
| 15 min @ 160° C. | 87 | 162 | 130 | 154 | 169 |
| 25 min @ 180° C. | 114 | 104 | 119 | 106 | 108 |
| 40 min @ 200° C. | 178 | 98 | 113 | 105 | 111 |
| Odor note 1-6 | 5 | 3.5 | 3.5 | 4 | 4 |
| Foam structure, optical evaluation | small pores | small pores | small pores | small pores | small pores |

TABLE 3

Example formulation C (EVA-based, peroxide-crosslinking)

| Substance name/group (generic name) | Comparative recipe 1C | Recipe 1C according to the invention | Recipe 2C according to the invention | Recipe 3C according to the invention | Recipe 4C according to the invention |
|---|---|---|---|---|---|
| Ethylene/vinyl acetate copolymer (38-42% VA content, MFI 3 g/10 min (190° C., 2.16 kg)) | 19.77 | 17.77 | 17.77 | 17.77 | 17.77 |
| Ethylene/vinyl acetate copolymer (28% VA content, MFI 0.7 g/10 min (190° C., 2.16 kg)) | 13.18 | 12.18 | 12.18 | 12.18 | 12.18 |
| Ethylene/vinyl acetate copolymer (27.2-28.8% VA content, MFI 5.3-6.7 g/10 min (190° C., 2.16 kg)) | 39.54 | 36.75 | 36.75 | 36.75 | 36.75 |
| Carbon black | 1.37 | 1.37 | 1.37 | 1.37 | 1.37 |
| Mixture of saturated C16-C18 fatty acids | 1.32 | 1.32 | 1.32 | 1.32 | 1.32 |
| Polyethylene (MFI 0.3 g/10 min (190° C., 2.16 kg), density 0.93 g/cm$^3$) | 10.97 | 9.96 | 9.96 | 9.96 | 9.96 |
| 4-Methylphenyl, reaction product with dicyclopentadiene and isobutylene (melting point 115° C.) (antioxidant) | 0.90 | 0.90 | 0.90 | 0.90 | 0.90 |

TABLE 3-continued

Example formulation C (EVA-based, peroxide-crosslinking)

| Substance name/<br>group (generic<br>name) | Comparative<br>recipe 1C | Recipe 1C<br>according to<br>the<br>invention | Recipe 2C<br>according to<br>the<br>invention | Recipe 3C<br>according to<br>the<br>invention | Recipe 4C<br>according to<br>the<br>invention |
|---|---|---|---|---|---|
| Activated azodicarbonamide (gas yield 160-180 ml/g, decomposition temp. 142-154° C.) (exothermic blowing agent) | 7.22 | — | — | — | — |
| Sodium hydrogen carbonate (endothermic blowing agent) | — | 14.00 | — | — | — |
| Mixture of sodium hydrogen carbonate/citric acid/citrate (endothermic blowing agent) | — | — | 14 | — | — |
| Sodium hydrogen carbonate (endothermic blowing agent) | — | — | — | 14 | — |
| Sodium hydrogen carbonate (endothermic blowing agent) | — | — | — | — | 14 |
| Dicumyl peroxide on chalk (content 38-42%, active oxygen content 2.2-2.5%) (peroxide crosslinker) | 4.35 | 4.35 | 4.35 | 4.35 | 4.35 |
| 1,1-Di-(tert-butylperoxy)-3,3,5-trimethylcyclohexane (content 39-41%, active oxygen content 10.6%) (peroxide crosslinker) | 1.40 | 1.40 | 1.40 | 1.40 | 1.40 |
|  | 100.00 | 100.00 | 100.00 | 100.00 | 100.00 |

Expansion [%]

| | | | | | |
|---|---|---|---|---|---|
| 20 min @ 140° C. | 12 | 14 | 49 | 19 | 18 |
| 15 min @ 160° C. | 1058 | 356 | 160 | 231 | 350 |
| 25 min @ 180° C. | 1017 | 365 | 244 | 328 | 416 |
| 40 min @ 200° C. | 1089 | 349 | 320 | 334 | 259 |
| Odor note 1-6 | 3 | 3 | 3 | 3 | 2 |
| Foam structure, optical evaluation | large pores | small pores | small pores | small pores | medium to large pores |

TABLE 4

Example formulation D (EVA-based, peroxide-crosslinking)

| Substance name/<br>group (generic<br>name) | Comparative<br>recipe 1D | Recipe<br>1D<br>according<br>to the<br>invention | Recipe<br>2D<br>according<br>to the<br>invention | Recipe<br>3D<br>according<br>to the<br>invention | Recipe<br>4D<br>according<br>to the<br>invention | Recipe<br>5D<br>according<br>to the<br>invention |
|---|---|---|---|---|---|---|
| Ethylene/vinyl acetate copolymer (18-19.5% VA content, 2-5 g/10 min at 190° C./2.16 kg, melting point 85-89° C.) | 84.00 | — | — | — | — | — |

TABLE 4-continued

Example formulation D (EVA-based, peroxide-crosslinking)

| Substance name/ group (generic name) | Comparative recipe 1D | Recipe 1D according to the invention | Recipe 2D according to the invention | Recipe 3D according to the invention | Recipe 4D according to the invention | Recipe 5D according to the invention |
|---|---|---|---|---|---|---|
| Ethylene/vinyl acetate copolymer (18% VA content, MFI 1.7 g/10 min (190° C., 2.16 kg)) | — | 39.55 | — | 39.66 | — | — |
| Ethylene/vinyl acetate/methacrylic acid terpolymer (28% VA content, MFI 4.5-7.5 g/10 min (190° C., 2.16 kg)) | — | — | — | — | — | 72.6 |
| Vinyl/butyl acrylate copolymer (30% butyl acrylate, MFI 4.5-7.5 g/10 min (190° C., 2.16 kg)) | — | 40 | 76.05 | 39.66 | — | — |
| Ethylene/N-butyl acrylate/glycidyl methacrylate terpolymer (melting point 72° C., MFI 12 g/10 min (190° C., 2.16 kg)) | — | — | — | — | 72 | — |
| Randomized ethylene/acrylic acid ester/glycidyl methacrylate terpolymer (24% methyl acrylate, MFI 6 g/10 min (190° C., 2.16 kg)) | — | — | — | — | 7 | 7 |
| LDPE (low density polyethylene | 4.99 | — | — | — | — | v |
| Talc (filler) | 3.26 | — | — | — | — | — |
| Benzenesulfinic acid Zn salt (activator for azodicarbonamide) | 0.40 | — | — | — | — | — |
| Trimethylolpropane trimethacrylate (co-crosslinker) | 1.60 | — | — | 1.00 | 1.00 | — |
| Di-(tert-butylperoxy-isopropyl)benzene (40% on chalk/silicic acid) (peroxide crosslinker) | 1.00 | — | — | — | — | — |
| Di-tert-butyl-1,1,4,4-tetramethylbut-2-in-1,4-ylene diperoxide on chalk (content 45%) (peroxide crosslinker) | — | 1.25 | 1.25 | 0.66 | — | — |
| Dibenzoyl peroxide on chalk (content 45%) (peroxide crosslinker) | — | — | — | — | 0.7 | 1.2 |
| Bis-(3,3-bis-(4'-hydroxy-3-tert-butylphenyl)-butanoic acid) glycol ester (antioxidant) | 0.12 | 0.2 | 0.2 | 0.3 | 0.3 | 0.2 |

TABLE 4-continued

Example formulation D (EVA-based, peroxide-crosslinking)

| Substance name/group (generic name) | Comparative recipe 1D | Recipe 1D according to the invention | Recipe 2D according to the invention | Recipe 3D according to the invention | Recipe 4D according to the invention | Recipe 5D according to the invention |
|---|---|---|---|---|---|---|
| Diphenyloxide-4,4'-disulfohydrazide (decomposition temperature 140-160° C., gas yield 130-140 ml/g) (exothermic blowing agent) | 1.00 | — | — | — | — | — |
| Azodicarbonamide (gas yield approx. 220 ml/g) (exothermic blowing agent) | 3.61 | — | — | — | — | — |
| Sodium hydrogen carbonate (gas yield 130 ml/g) (endothermic blowing agent) | — | 3 | — | — | — | — |
| Sodium hydrogen carbonate (gas yield 130 ml/g) (endothermic blowing agent) | — | — | — | 3.72 | — | — |
| Sodium hydrogen carbonate (gas yield 165 ml/g) (endothermic blowing agent) | — | — | 2.5 | — | 3 | 3 |
| Sodium hydrogen carbonate in polyethylene (active substance content 60%, gas yield 90-100 ml/g) (endothermic blowing agent) | — | — | — | 15 | 16 | 16 |
| Citric acid (endothermic blowing agent) | — | 16 | 20 | — | — | — |
| TOTAL | 100.00 | 100.00 | 100.00 | 100.00 | 100.00 | 100.00 |
| 15 min @ 160° C. | 462 | 541 | 652 | 697 | 561 | 556 |
| 25 min @ 180° C. | 580 | 673 | 908 | 548 | 535 | 658 |
| 40 min @ 200° C. | 484 | 683 | 809 | 504 | 533 | 562 |
| Odor note 1-6 | 3 | 2 | 2 | 2 | 2 | 2 |
| Foam structure, optical evaluation | small pores | small pores | small pores | small pores | small pores | small pores |

The tests according to the invention show a reduced emission behavior, as can be demonstrated with reference to comparative series A. At the same time, the results in terms of the expansion behavior were able to be improved or at least kept constant relative to the conventional blowing agents. The examples according to the invention show an improvement in terms of odor, with the aging behavior and pore structure being comparable between the comparative examples and the examples according to the invention.

What is claimed is:

1. A thermally expandable composition containing at least one endothermic chemical blowing agent, at least one reactive binder, anhydride containing copolymers present in an amount of 5 wt. % to 20 wt. % and at least one of a curing agent and an accelerator.

2. The thermally expandable composition according to claim 1, wherein the at least one endothermic chemical blowing agent is selected from bicarbonates, solid polycarboxylic acids, solid polycarboxylic acid salts and mixtures thereof; and the at least one reactive binder is selected from the group consisting of epoxies, rubbers, peroxide-crosslinkable polymers and combinations thereof.

3. The thermally expandable composition according to claim 2, wherein the endothermic chemical blowing agent contains a bicarbonate of formula $XHCO_3$, wherein X is a cation.

4. The thermally expandable composition according to claim 3, wherein X is selected from $Na^+$, $K^+$, $\frac{1}{2}Zn^{2+}$, $\frac{1}{2}Mg^{2+}$, $\frac{1}{2}Ca^{2+}$ and mixtures thereof.

5. The thermally expandable composition according to claim 2, wherein the endothermic chemical blowing agent contains a mixture of 2 or more bicarbonates.

6. The thermally expandable composition according to claim 2, wherein the solid polycarboxylic acids are selected from organic di-, tri-, tetra-acids and combinations thereof.

7. The thermally expandable composition according to claim 2, wherein the solid polycarboxylic acids comprise hydroxyl-functionalized and/or unsaturated di-, tri-, tetra- or polycarboxylic acids.

8. The thermally expandable composition according to claim 2, wherein the endothermic chemical blowing agent is selected from citric acid, tartaric acid, malic acid, fumaric acid, maleic acid, salts of citric acid, tartaric acid, malic acid, fumaric acid, maleic acid and mixtures thereof.

9. The thermally expandable composition according to claim 1, wherein the endothermic chemical blowing agent contains a mixture of sodium bicarbonate with citric acid and/or citrate.

10. The thermally expandable composition according to claim 1, wherein the composition contains the endothermic chemical blowing agent in an amount of 0.1 to 35% by weight, based on the total composition.

11. The thermally expandable composition according to claim 1, wherein the composition contains less than 0.05% by weight of exothermic blowing agents.

12. The thermally expandable composition according to claim 1, wherein upon activation the blowing agents do not produce formamide, formaldehyde or nitrosamines.

13. The thermally expandable composition according to claim 2, wherein the endothermic chemical blowing agent contains a bicarbonate of formula $XHCO_3$, wherein X is a cation.

14. A method for sealing and filling cavities in components and shaped bodies, for strengthening or reinforcing components, or for bonding movable components comprising steps of introducing into a cavity of a component or shaped body or applying to a surface of a component, a thermally expandable composition comprising at least one endothermic chemical blowing agent selected from bicarbonates, solid polycarboxylic acids, solid polycarboxylic acid salts and mixtures thereof; at least one reactive binder selected from the group consisting of epoxies, rubbers, peroxide-crosslinkable polymers and combinations thereof; and at least one of a curing agent and an accelerator; wherein the thermally expandable composition contains less than 0.05% by weight of azodicarbonamide and 4,4'-oxybis (benzenesulfonyl hydrazide); and activating the composition such that the thermally expandable composition expands and seals, fills, strengthens or reinforces the component.

15. The method according to claim 14 for sealing and filling cavities in components, for strengthening or reinforcing components, wherein a shaped body comprising the thermally expandable composition is introduced into a component, and then is heated to a temperature above 110° C. such that the thermally expandable composition expands and seals, fills, strengthens or reinforces the component.

16. The thermally expandable composition according to claim 1, wherein the thermally expandable composition comprises calcium oxide.

17. The thermally expandable composition according to claim 1, wherein the thermally expandable composition comprises guanidines, substituted guanidines, melamine resins, guanamine derivatives, cyclic tertiary amines, aromatic amines and/or mixtures thereof.

* * * * *